UNITED STATES PATENT OFFICE.

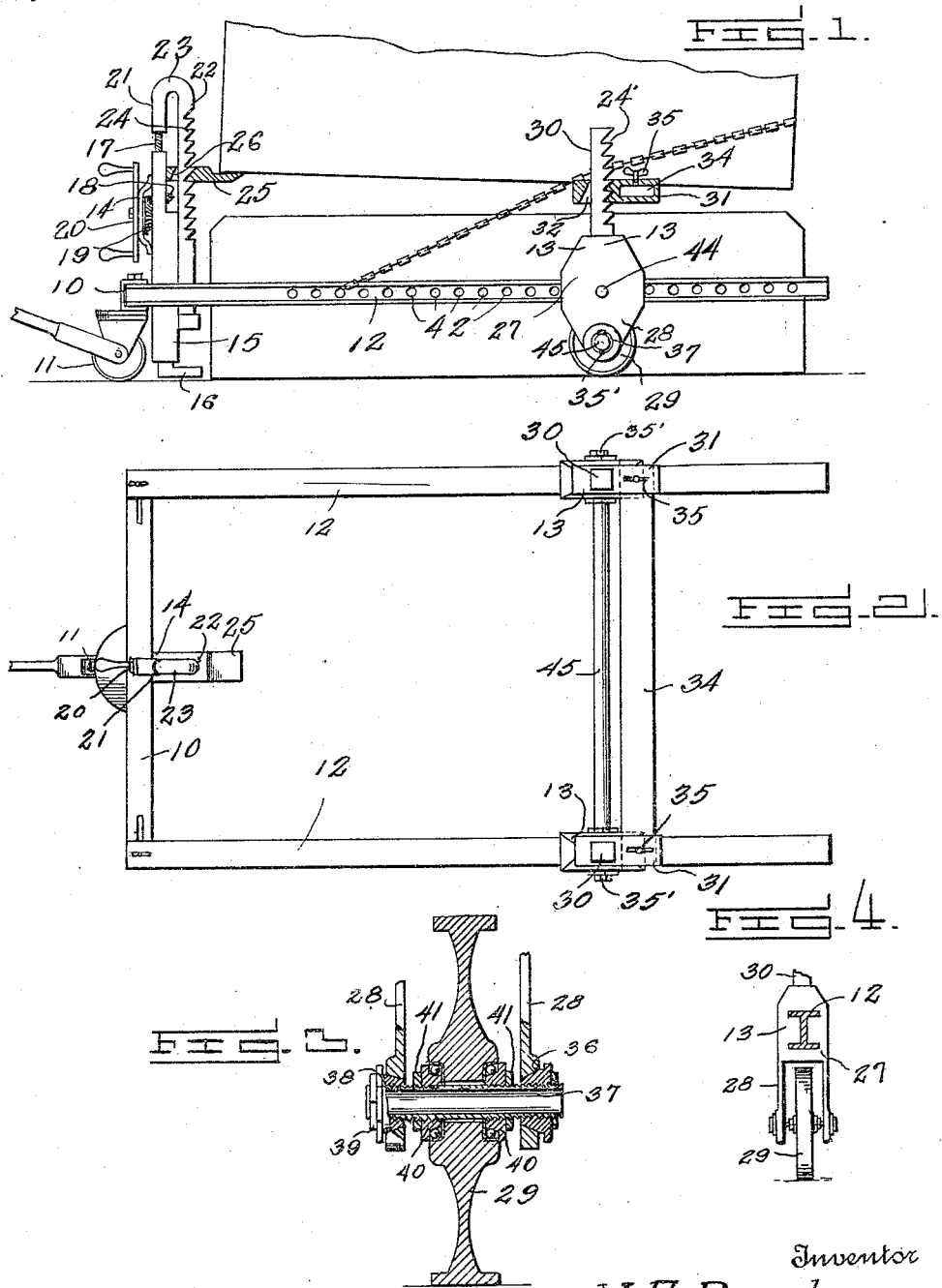

VICTOR E. BEAGLE, OF BINGHAMTON, NEW YORK.

TRUCK.

1,230,839. Specification of Letters Patent. Patented June 26, 1917.

Application filed June 10, 1916. Serial No. 102,925.

*To all whom it may concern:*

Be it known that I, VICTOR E. BEAGLE, a citizen of the United States, residing at Binghamton, in the county of Broome and State of New York, have invented certain new and useful Improvements in Trucks, of which the following is a specification.

The invention has for an object to give an improvement in trucks suitable for moving stones and other heavy objects, wherein the truck is so constructed that it may be moved into position around the load before loaded upon the truck. An important object is to effect such an improvement that the wheel mounting may be utilized to carry a removable element for engagement under the work after one end thereof has been lifted by a jack upon the truck. It is also an important object to give an improved form of mounting for the wheels of a satisfactory and simple character, which will at the same time permit the use of ball or roller bearings, as will be readily understood from the disclosures herein. Another important object is to provide a simplified construction of truck wheel mounting adjustable on the frame of the truck at the side and of an adjustable and removable load support.

Additional objects, advantages and features of invention will appear from the construction, arrangement and combination of parts, as herein described and shown in the drawings, where, Figure 1 is a side elevation of a truck constructed in accordance with this invention.

Fig. 2 is a top plan view of the truck,

Fig. 3 is a detail of the wheel mounting.

Fig. 4 is a detail elevation of one of the adjustable wheel forks for the frame, with a portion of the element 30 broken away.

There is illustrated a truck frame comprising a front cross piece 10, supported upon any suitable form of steering wheel 11, the frame including side members 12 extending rearwardly from the cross piece and having sliding forks 13 thereon respectively, adjustable to any desired position longitudinally of the truck. The cross piece 10 carries a suitable form of jack 14, including an upright guide piece 15 secured to the cross piece in a suitable manner, in which there is slidable the lifting foot 16, including the worm threaded shank 17 extended upwardly through a suitable geared nut 18 carried upon the top of the guide piece 15. Meshed with the gear 18 there is a similar gear 19 carried upon the frame 15, and operable by means of the handle crank 20. Engaged on the worm shank 17 there is a jack extension 21, in the form of a bar having a goose-neck 23 at the upper end, formed with a socket adapted to receive the upper end of the shank 17 revolubly therein, the bar 22 having a series of large teeth 24 having horizontal upper sides, and inclined lower sides converging therewith, while on the bar there is slidable a supplementary or upper lifter foot 25 having a diagonal opening 26 therethrough at its enlarged base portion, whereby when the outer end of the foot is tilted upwardly the device may be moved slidably upwardly and downwardly upon the bar 22, and when allowed to fall into horizontal position the lower front edge portion of the diagonal opening will engage over one of the teeth 24, while the back portion of the opening presses against the back of the bar 22.

The forks 13 are similar. Each comprises a cast body portion 27, suitably shaped to engage slidably upon the side members 12 of the frame of the truck, and including downwardly extending legs 28 between which there is mounted as will be subsequently described a wheel 29. At its upper side the casting 27 is extended a distance above the side members 12, and has set therein an upright arm 30, formed with teeth 24' similar to those on the jack extension 21 before described, and slidable upon this bar 30 in the same manner as the foot piece 25, there is a bracket piece 31. The teeth 24' are formed on the rear side of the bar 30, which is engaged through an opening 32 in the bracket similar to the opening 26 in the bracket 25. The bracket 31 extends rearwardly, and is provided with a transverse opening therethrough, to receive a bar 34 removably, to extend across the space within the truck frame when desired. Engaged through the upper side of the bracket there is a hand screw 35, which may be screwed inward to impinge against the bar 34, and hold the same rigidly in place. This also serves to tie the sides of the frame together and prevent displacement of the sides 12 relatively, after a load is in place, or after the hand screws are secured.

Each of the legs 28 is formed at its lower part with a conical transverse opening 36, the larger part being presented outwardly, and a transverse hollow shaft 37 is mounted between the legs 28 of each truck, having a length slightly greater than the distance between the outer sides of the legs, and being suitably threaded for the engagement of cones and nuts as will be described. Engaged on each outer part of the shaft there is a large cone 38, fitted snugly in the opening 36, and this cone is held securely in place by means of a lock nut 39 also screwed upon the shaft 37. By properly screwing the cones 38 into the legs 28, the shaft 37 is held rigidly and without vibration in its place. On the inner part of the shaft 37 at each side of the wheel, there are mounted suitable cones 40 of any familiar form, the wheel being constructed in any suitable way to provide for the mounting of ball bearings therein to rest upon the cones. Lock nuts 41 are provided to hold the cones securely in place at the sides next to the legs 28. The fork elements 13 may be secured in adjusted positions on the side members 12 by means of pins 44 inserted therein and engaged through the openings in the side members 12. The side pieces 12 are formed with longitudinally spaced transverse apertures 42 therethrough.

In use, where the load to be moved is near the surface of the ground or floor upon which the truck travels, the extension piece 21 is removed, and the bar 34 disposed in a position on the truck where it will not interfere with the introduction of an object within the truck frame. The truck is backed into position with the side pieces 12 on each side of the object to be moved, and the foot 16 being lowered to a level with the bottom of the object, the truck is backed until the foot engages under the object, and the jack 14 then operated to lift the object until its lower side rises above the level of the openings through the shafts 37. A suitable bar 45 is then inserted through one shaft 37 beneath the object to be moved, and into the other shaft 37, after which the jack 14 is operated to lower the lifted end of the object until it rests upon the bar 45 and the rear end of the object has risen from the ground a sufficient distance to permit proper movement of the truck. Any suitable fastening means may be provided to hold the object against longitudinal movement in the truck frame during or after hoisting.

When an object is to be moved from an elevated position, as in the case of a monument, where one stone is to be moved from a base stone, as illustrated in Fig. 1, the extension piece 21 being engaged upon the jack 14, and the end of the monumental stone being wedged upwardly, the truck is backed into position, and the foot piece 25 inserted under the lifted end of the monument stone when the jack 14 is operated to lift the stone. The bracket pieces 31 at each side of the truck being adjusted at the right height, and the fork elements 13 being adjusted rearwardly of the center of gravity of the monument stone, the bar 34 is then inserted beneath the monument stone and in the brackets 34, after which the jack is operated to lower the lifted end of the monument stone until it rests upon the bar 34 and clears the base stone after which the truck may be moved, the hand wheel 35 having been properly tightened. Retaining pins 35' may also be engaged through the ends of the shaft 45 to secure it rigidly against lateral movement in the fork elements 13.

One method of securing the truck against relative longitudinal movement with respect to the work while being loaded, consists in attaching a chain 46 to the side of the truck frame, the chain being carried around behind the object to be moved, as shown in Fig. 1, and being sufficiently taut to prevent the truck from moving forward when the object is lifted at the forward end. When the object is to be lifted from the ground, the chain may be passed therearound on a level with the frame of the truck, and in the case of a monument stone upon an elevated base, the chain may be carried over the bar 34, as illustrated.

It will be apparent from the foregoing and the illustrations that a very simple construction of truck is provided having great advantages in assuring security of the load and safety of the truck structure against unnecessary strain.

What is claimed:

1. An adjustable wheel mounting for trucks of the character described comprising a body element constructed for slidable engagement upon a truck side frame, an upstanding arm carried thereby, a vertically slidable bracket carried thereby, means for securing the bracket adjustably thereon, and a supporting wheel carried by the said mounting.

2. In a truck of the character described a wheeled frame having a wheel element at the forward part, said frame including longitudinal side members, wheel mountings slidably engaged therewith each comprising a body element, an upstanding arm thereon, a vertically adjustable bracket thereon, a transverse removable load support engaged with the brackets, and a supporting wheel carried by each wheel mounting.

3. An adjustable wheel mounting for side members of truck frames comprising a body element, leg elements carried thereby having tapered transverse openings therethrough, a hollow shaft engaged through the openings, cones secured upon the shaft engaged snugly in said openings, and a revoluble wheel mounted upon the shaft between the legs.

4. In a truck of the character described, a frame including side elements, a longitudinally adjustable supporting wheel mounting on each, including an axle mounting, a hollow axle shaft carried thereby, and a revoluble supporting wheel mounted upon the shaft, and a transverse removable load support slidable in the hollow shafts.

5. In a truck of the character described a wheeled frame having a wheel element at the forward part, said frame including longitudinal side members, wheel mountings slidably engaged therewith each comprising a body element, an upstanding arm thereon, a vertically adjustable bracket thereon, a transverse removable load support engaged with the brackets, means to secure said transverse support at each end on respective wheel mountings, and a supporting wheel carried by each said mounting.

6. In a truck of the character described a frame including side members, longitudinally adjustable wheel mountings thereon, a transverse piece removably engaged therewith, and means to secure the transverse piece and wheel mountings together.

In testimony whereof I have affixed my signature in presence of two witnesses.

VICTOR E. BEAGLE.

Witnesses:
ALBERT S. BARNES,
M. R. HART.

Copies of this patent may be obtained for five cents each, by addressing the "Commissioner of Patents, Washington, D. C."